(12) United States Patent
Damm (10) Patent No.: US 7,733,794 B2
(45) Date of Patent: Jun. 8, 2010

(54) PERFORMANCE MONITORING OF FRAME TRANSMISSION IN DATA NETWORK OAM PROTOCOLS

(75) Inventor: Gerard Damm, Plano, TX (US)

(73) Assignee: Alcatel Lucent, Paris (FR)

(*) Notice: Subject to any disclaimer, the term of this patent is extended or adjusted under 35 U.S.C. 154(b) by 818 days.

(21) Appl. No.: 11/383,741

(22) Filed: May 16, 2006

(65) Prior Publication Data

US 2006/0285501 A1  Dec. 21, 2006

Related U.S. Application Data

(60) Provisional application No. 60/691,493, filed on Jun. 17, 2005.

(51) Int. Cl.
*H04J 1/16* (2006.01)
(52) U.S. Cl. ..................... 370/252
(58) Field of Classification Search ................. 370/252, 370/236.2, 241.1
See application file for complete search history.

(56) References Cited

U.S. PATENT DOCUMENTS

| | | | | |
|---|---|---|---|---|
| 5,450,394 A * | 9/1995 | Gruber et al. | ............... | 370/253 |
| 5,764,626 A * | 6/1998 | VanDervort | ................. | 370/232 |
| 6,058,102 A * | 5/2000 | Drysdale et al. | ............ | 370/252 |
| 6,215,772 B1 | 4/2001 | Verma | | |
| 2005/0099949 A1* | 5/2005 | Mohan et al. | ............ | 370/236.2 |

FOREIGN PATENT DOCUMENTS

| | | |
|---|---|---|
| EP | 0195636 A | 5/1999 |
| EP | 0915635 A1 | 5/1999 |
| WO | 0233893 A | 4/2002 |

OTHER PUBLICATIONS

Sato, Naoshi, Okamoto, Tsukas and Yokio, Tadahiro, "Performance Monitoring Method Using OAM Cells in B-ISDN", ICC '91, 1991, IEEE, 264-269, US.
International Telecommunication Union, "ITU-T Recommendation I.610 Series I: Integrated Services, Digital Network Maintenance Principles", International Telecommunication Union, Feb. 1999.
International Telecommunication Union, "ITU-T Recommendation O.191 Series O: Specifications of Measuring Equipment—Equipment for the measurement of digital and analogue/digital parameters", International Telecommunication Union, Feb. 2000.

* cited by examiner

*Primary Examiner*—Derrick W Ferris
*Assistant Examiner*—Mohammad Anwar
(74) *Attorney, Agent, or Firm*—Garlick Harrison & Markison (57) ABSTRACT

Performance measurements for a network, such as delay, delay variation, and loss, are performed over layer-2. A PM frame is sent from a source MEP (Maintenance End Point) to a destination MEP. The PM frame is timestamped immediately prior to transmission, and the local clock at the destination MEP is noted immediately upon arrival. MIPs (Maintenance Intermediate Points) may also time stamp the PM frame. Preferably, each PM frame has an interval (session) identifier and a sequence number within the interval. The PM frames are received by and sent by PM modules within the nodes of the network. The PM modules include a Sender function for sending an interval of one or more PM frames and a Receiver function for receiving PM frames and computing measurements.

16 Claims, 4 Drawing Sheets

PERFORMANCE MONITORING OF FRAME TRANSMISSION IN DATA NETWORK OAM PROTOCOLS

CROSS-REFERENCE TO RELATED APPLICATIONS

This application claims the benefit of the filing date of provisional application U.S. Ser. No. 60/691,493, filed Jun. 17, 2005, entitled "PERFORMANCE MONITORING OF FRAME TRANSMISSION IN DATA NETWORK OAM PROTOCOLS".

STATEMENT OF FEDERALLY SPONSORED RESEARCH OR DEVELOPMENT

Not Applicable

BACKGROUND OF THE INVENTION

1. Technical Field

This invention relates in general to data communications and, more particularly, to performance monitoring of frame transmission in a data network.

2. Description of the Related Art

There is a growing demand for network performance monitoring in data network. Until recently, this network performance monitoring was used mostly for network troubleshooting (network management, status and alarms) in addition to usual methods of connectivity tests. Now, it is also needed for SLA (Service Level Agreement) checking, billing, and network security (flood attack detection, etc.). Accordingly, the status of performance monitoring is changing from an interesting endeavor to one that is necessary and required.

While network performance measuring at layers 3 and above, with limited accuracy, was previously sufficient, more accuracy is currently needed. Next generation networks require higher accuracy and more integration in the network management and the protocols. Delay, delay variation ("jitter"), and loss are three critical metrics to estimate the quality of essential services like voice and video streaming for instance. Operators and providers must be able to measure these metrics, so as to verify that they actually provide the agreed SLA to their customers, and to detect and react quickly should the metrics fall under the agreed levels.

In general, performance monitoring can be achieved either passively (i.e. by observing actual user traffic and possibly adding some specific marking information) or actively (i.e. by injecting extra control traffic for the purpose of performance measurement). Active solutions are usually preferred, since they are much easier to deploy, although they are inherently less accurate because they inject extra traffic into the same network that they are measuring. Passive solutions are more accurate, but require more complex architectures, essentially to correlate the observed packets at ingress and egress.

One form of a passive performance monitoring solution consists of maintaining local counters in nodes (information traps). RMON (Remote Monitoring) is an example of counter-based solution (IETF RFC2819 for RMON-1, RFC 2021 for RMON-2). The data is stored in MIBs (Management Information Bases) and exchanged usually via SNMP (Simple Network Management Protocol). Counters keep track of data such as number of octets, frames, errors, collisions, type (broadcast, multicast), size buckets (frames between 64 and 127 octets, etc.), or more specific information such as a count of octets between pairs of endnodes, identified, for instance, by their MAC (Media Access Control) addresses ("matrix"-type counters). Alarms can be raised by an RMON probe, based on user-defined thresholds or filters: for instance, if a counter exceeds a certain threshold, the probe will raise an alarm. Filters allow to capture the frames that match a certain filter (for post-replay for example, or just event logging).

A problem with using counters is that local counters do not provide the basis for a measurement of Delays or Delay Variations. In the measurement of Losses, there needs to be an exchange of counter information between a sending node and a receiving node in order to correlate between the observed frames, which adds a layer of complexity to the measurement.

Most of today's performance monitoring systems are implemented at layer-3 (IP level). IPPM (IP Performance Metrics) is an IETF work group responsible for defining the metrics and providing guidance for implementation. In particular, the theoretical foundation for statistical significance of measurement is provided. IPPM has issued a number of RFCs: 2330, 2678, 2679, 2680, 2681, 3148, 3357, 3393, 3442, and is working on drafts for a signalling protocol (OWAMP: One-Way Active Measurement Protocol) and new metrics (multiparty and reordering). ITU has released ITU-T documents Y.1540 and Y.1541. Software tools for IP-level performance measurement abound (wvww.caida.org., www.ripe.net/test-traffic/) and several vendors provide some form of software or hardware for IP-level performance monitoring, in addition to the usual user traffic counters used for measuring error rates, bandwidth usage, etc. U.S. Pat. Nos. 6,868,094 and 6,868,068 describe IP level measurement systems.

The methodological approach from IETF's IPPM (randomization, measurement error analysis with calibration) provides good statistical significance, but the layer at which it is applied unfortunately reduces the quality of the measurement. At the IP level, a stream of packets from a source to a destination may use different paths, so the obtained measurements can be different even if everything else is the same otherwise. Moreover, a general implementation rule is that the farther the measurement module is from the line interface, the less accurate the timestamping will be. Additionally, the measurement packet approach has to be deployed separately, since it is not part of a standardized OAM infrastructure for IP: this is a problem for operators, who prefer simplicity and automation (integration of the performance monitoring directly in the OAM framework). Further, IPPM requires the creation of a session for measuring performance.

Another array of solutions consists in adding overlay measurement equipment (using a separate box with several modules, or compatible third party board/module using a slot in a vendor node, or even mobile handheld device) to an existing network. This additional equipment may include other functions, typically protocol conformance testing, physical signal quality verification (electrical or optical), etc. Performance monitoring using overlay equipment can be performed at any layer, including the application layer (for instance, fake phone calls are generated to monitor VoIP performance).

Performance measurement using overlay equipment, however, can greatly increase the cost of monitoring a network.

Therefore, a need has arisen for a accurate, cost effective method and apparatus for performance monitoring in a data network.

BRIEF SUMMARY OF THE INVENTION

In the present invention, performance monitoring is performed in a network by generating layer-2 performance monitoring frames by a first node, wherein the performance monitoring frames have one or more type fields identifying the frame as a performance monitoring frame, an origination timestamp field specifying the time that the frame is transmitted and wherein one or more features of the performance monitoring frames is varied. The performance monitoring frames are transmitted through the network during a preset interval. Performance monitoring frames are received by a second node in the network and an arrival timestamp associated with the reception of the performance monitoring frames is stored. Performance criteria is determined from the origination and arrival timestamps of the performance monitoring frames.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-8 of the drawings, like numerals being used for like elements of the various drawings.

Figure 1:
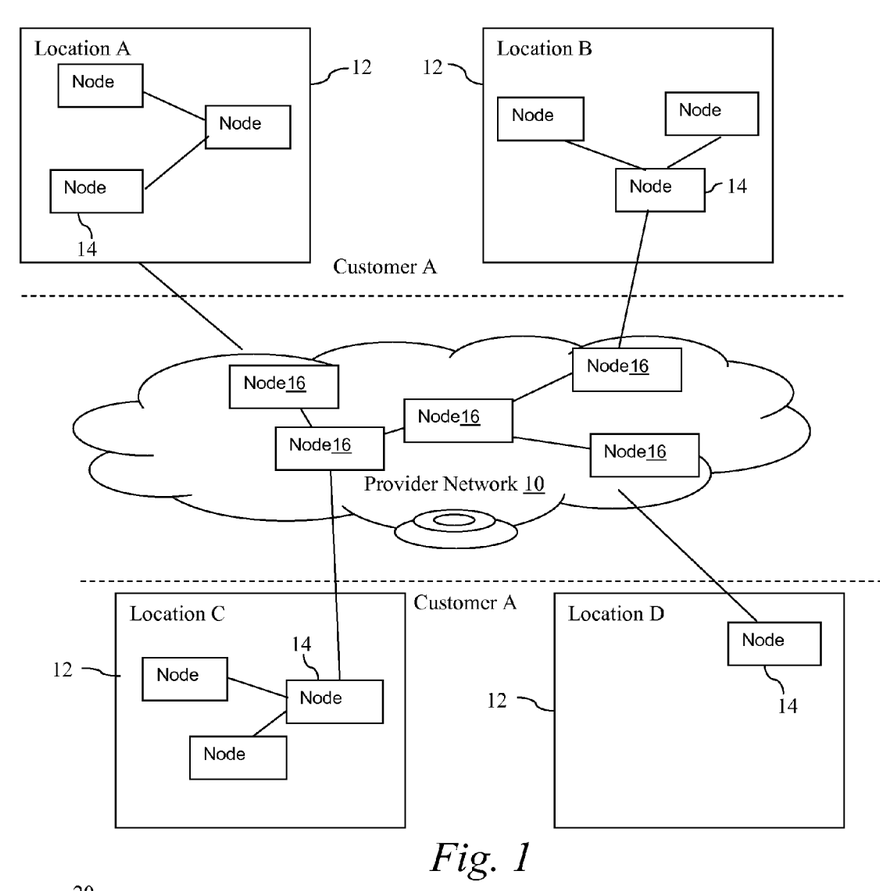
FIG. 1 illustrates a very simplified diagram of a network environment in which the present invention could be implemented.

FIG. 1 illustrates a very simplified diagram of an environment in which the present invention could be used. A provider network 10 links one or more locations of a customer network. In the illustrated embodiment, the customer network is shown having four locations (illustrated individually Locations A, B, C and D), each having its own local network 12. Edge nodes 14 provide a connection between the local area networks 12 and the provider nodes 16 of the provider network 10. The provider network 10 thus connects the various local networks 12 to form a wide area network.

In an actual implementation, the provider network 10 could support multiple customers, and it may use additional third party provider networks to provide the necessary connectivity.

Presently, situations such as that described above provide a service level agreement (SLA) which states performance levels for the provider network. Included in the SLA may be criteria for throughput, maximum delays, delay variation and data loss. The criteria may depend upon the use of wide area network; for example, the network may run application for VOIP (voice over IP) telephony and video conferencing. In this case, delays, delay variations (sometimes referred to as "jitter") and losses can be critical.

The preferred embodiment of the present invention uses a specific OAM frame ("PM frame") for layer-2 (data link layer) performance monitoring. The PM frame is integrated in the OAM (Operations and Maintenance) for network management efficiency and simplicity. The PM frame is preferably in addition to other OAM frames currently developed in the 802.1ag series of drafts, specifically the CC (Connectivity Check), LB (Loop-Back), LT (Link Trace), and AIS (Alarm Indication Signal) frames. While the PM frame will be described as part of an Ethernet layer-2 environment, it could also be used in other layer-2 contexts, such as MPLS (Multi-protocol Label Switching).

Figure 2:
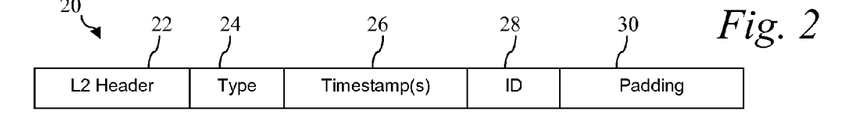
FIG. 2 illustrates a general diagram for the preferred structure of a PM (performance measurement) frame.

A general diagram for the preferred structure of a PM frame 20 is shown in FIG. 2. In addition to the normal header information 22, the PM frame 20 includes a Type field 24, a Timestamp field 26, and ID field 28 and a Padding field 30. These fields can be located in either the header or payload of the frame, as appropriate.

The Type field 24 contains indicia to distinguish the PM frame 20 as being an OAM frame of type PM. The Type field 24 could include a management level such as those defined in 802.1ag (eight levels from 0 to 7, for customers, providers and operators). In existing CFM (Connectivity Fault Management) 802.1ag, these two entries are referred to as "CFM" type and "ME level". In addition, a version entry in this field could be added for future expansion.

The Timestamp field stores one or more timestamps. Only one timestamp is necessary for one-way delay measurements, which are preferred. Multiple timestamps are supported. The time unit should be capable of representing microseconds, and should be made expandable to represent nanoseconds so as to remain usable in the future. Currently, the smallest Ethernet frame, sent on a small LAN (short distance), with a high transmission speed (close to the speed of light), and a high interface speed (10 Gb/s) would experience a delay of less than a microsecond. For ease of use, the time format could follow for instance the existing standard NTP (Network Time Protocol), which uses 64 bits (in two parts: 32 bits for the seconds, and 32 bits for the fraction of a second).

The ID field 26 contains an interval number and a sequence number (or any monotonically increasing identification scheme) to allow frame discrimination by the processing functions, and correlation between senders and receivers. This is described in greater detail below.

The Padding field 30 allows the size of the frame 20 to be varied to simulate real data frames.

In the illustrated embodiment, there are no specific fields in the PM frame 20 for categorization. It is expected that in Ethernet, categorization would be based on normal VLAN tags (C-tags, S-tags), on user priority bits and/or on drop precedence bits.

Figure 3:
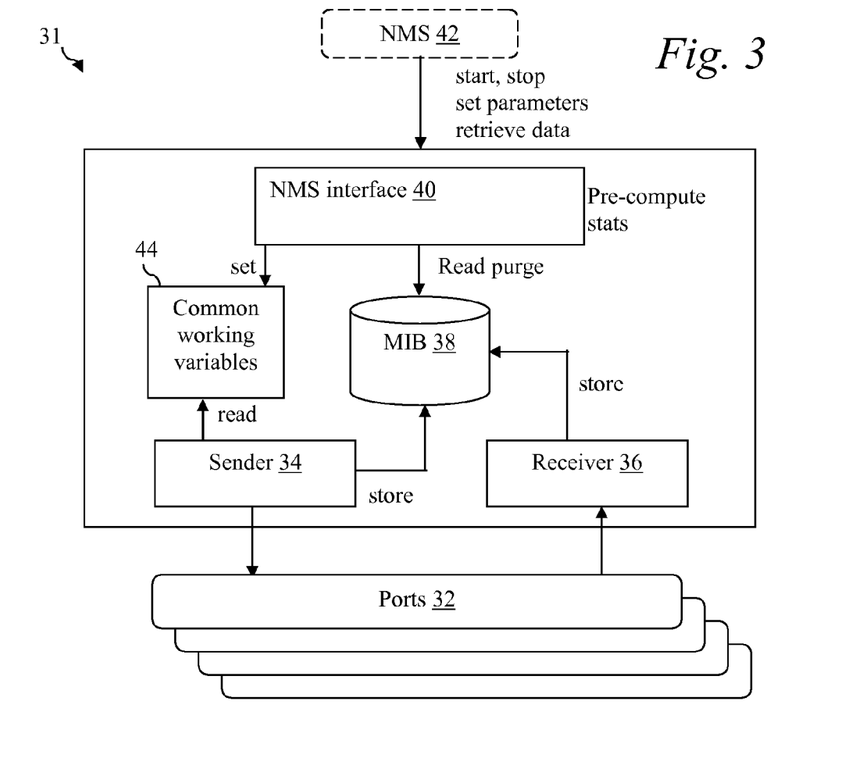
FIG. 3 illustrates a block diagram of a PM module.

The use of the PM frames will be explained in connection with the operation of PM modules 31, shown in greater detail in FIG. 3. The functions of the PM modules 31 could be implemented as routines in the bridge brains of any or all of the provider nodes 16 where performance measurements are necessary. The PM modules 31 could also be implemented on the customer nodes 14 as well. Data from layer-1 is sent and received over ports 32, where the data is used to form frames. Ports 32 are coupled to a Sender 34 and a Receiver 36. Sender 34 and Receiver 36 are coupled to a Management Information Base ("MIB") 38. A NMS (Network Management System) interface 40 couples MIB 36 to the NMS 42 (which is typically located in the Network Operations Center, or "NOC", of the provider). The NMS interface 40 receives the commands from the NMS 42, updates the working variables used by the Sender 34 and Receiver 36 and may perform pre-computations, such as sorting and synthesizing the data, to reduce the NMS workload and to minimize the data volume exported to the NMS 42. The Sender 34 generates the flow of randomized PM frames 20 and logs the number of frames sent per interval. The Receiver 36 intercepts PM frames 20 from other OAM frames and logs the measured delays.

Figure 4:
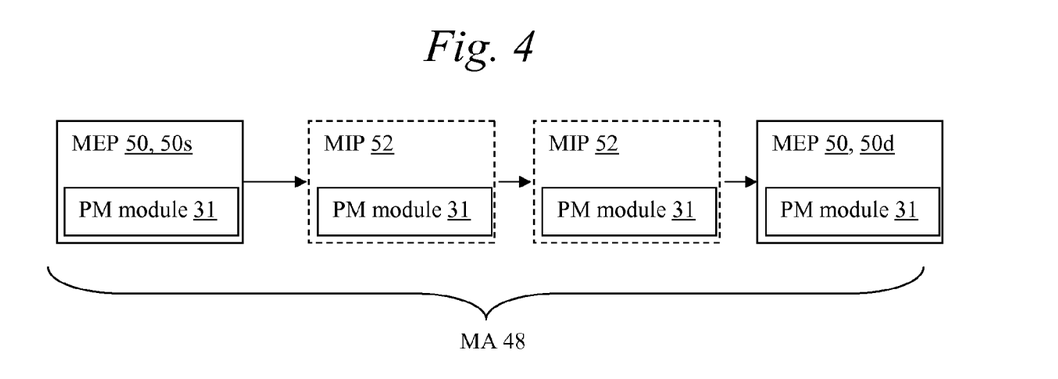
FIG. 4 illustrates a Maintenance Association.

Operation of the PM modules 31 are described in connection with FIG. 4. A Maintenance Association ("MA") 48 (also referred to as a Maintenance Entity Group, or "MEG" by ITU-T, to designate a group of point-to-point Maintenance Entities, or "ME") is defined as a group of two or more nodes 14 or 16, at least two of which contain a Maintenance End Point ("MEP") 50 and may include zero or more Maintenance Intermediate Points ("MIP"s) 52. Depending upon the type of module, not all components are necessary for the PM module 31. A MIP could implement only the Receiver 36 and NMS interface 40 without the Sender 34. On the other hand, a simplified MEP (such as one implemented in a residential gateway) could implement just the Sender 34 and a less complicated version of the NMS interface 40, without the Receiver 36.

Several different calculations can be performed using the PM frames 20. A one-way delay calculation can be performed by sending one or more PM frames 20 from a source MEP 50 (individually referenced as MEP 50*s*) to a destination MEP 50 (individually referenced as MEP 50*d*). When sent from the source MEP 50*s*, a timestamp is entered in the Timestamp field 26. When received at the destination MEP 50*d*, the PM frame 20 is recognized as a maintenance frame of type specified in the Type field 24 and is passed to the Receiver 36. The delay is calculated by subtracting the time in the Timestamp field 26 from the current time from the clock associated with the destination MEP 50*d*.

Several variations on this measurement can be made. By sending multiple PM frames (preferably at randomized intervals with randomized amounts of padding, described in greater detail below), an average one-way delay measurement can be calculated.

Further, the PM frame can be timestamped at each MIP 52 in the path as well. By providing timestamps from each MIP 52, a delay can be calculated for each leg of the transmission. For greater accuracy, the timestamps can be provided by both the sender 34 and receiver 36, with the difference in time subtracted from the delay.

A two-way delay measurement can be calculated by sending one or more PM frames 20 from the source MEP 50*s* to the destination MEP 50*d*, where it is timestamped by the destination MEP's Receiver 36 when received and the Sender 34 when sent back towards the source MEP 50*s*. The time difference between the destination Sender 34 and Receiver 36 is subtracted from the delay measurement for greater accuracy. It should be noted that a two-way delay measurement negates the need for exact synchronization between the source and destination MEPs 50.

A one-way delay variation calculation can be made by sending two or more PM frames 20 between the source MEP 50*s* and the destination MEP 50*d*. The difference in delays from source to destination for the two PM frames defines a delay variation. The delay variation can also be calculated over a stream of PM frames, preferably sent at randomized intervals with random padding sizes.

As before, delay variations for each leg of the path can be computed by timestamping the PM frame 20 at each MIP 52. Because the delay between sender and receiver in each MIP will cancel out in the variation calculation, only a single timestamp is needed at each MIP 52. A two-way delay variation calculation can be performed by sending the PM frames from the source MEP 50*s* to the destination MEP 50d and back to the source MEP 50*s*.

Loss calculations can be performed by sending a stream of PM frames from a source MEP 50*s* to a destination 50*d*. Frames that are not received in a certain period are counted as losses. Alternatively, a passive measurement of loss ratio can be computed by exchanging counter values of sent frames from the source MEP 50*s* and received frames as the destination MEP 50*d*.

The NMS 42 sets certain parameters for the source and destination MEP 50. A mean ETH-PM rate (bit/s) is set that the total of ETH-PM traffic remains negligible, e.g. less than 0.1% or even 0.01% of the physical available bandwidth (on average). A loss threshold (seconds) set a duration (starting from the sending time) after which a frame is considered lost. Typically, the loss threshold would be on the order of a few minutes (example: 200 seconds). Minimum and maximum frame sizes (octets) are used by the frame random length computation. Usually, the Ethernet payload min and max range from 46-1500 octets (or 46-9000 octets for jumbo frames). These parameters are stored in the common working variables 44 of the PM module 31.

The generation of PM frames 20 should enforce randomization and OAM traffic negligibility. For delay-related frames (Delay and Delay Variation), some form of non-biased generator should be implemented for the sending schedule (typically a Poisson process), and the frame length and padding should be randomized as well, to avoid incorrect measurements and optimization workarounds (node vendors could optimize their implementations for measurement frames if they were not randomized).

For loss-related frames, a mechanism should exist between a sending PM module 31 and a receiving PM module 31 to agree on a sending schedule (typically, sharing a random number generator seed and agreeing on an ID scheme), so that the receiving PM module 31 can decide whether a frame has been lost or not. Associated parameters (especially the "loss threshold") should be configurable in the NMS 42.

Preferably, the store/export functions should use existing standards (SNMP, TMN, IPFIX, CORBA, XML, and so on), although beneath the standardized interfaces, optimized proprietary implementations can be used.

The solution ensures better statistical significance of layer-2 measurements thanks to the required randomizations, is easier to manage for operators and providers since it is integrated in the OAM, does not require additional overlay equipment, and leverages the advantages of layer-2 monitoring: more accurate timestamping and deterministic paths. Accuracy improvements are due to the ability to timestamp closer to the physical layer, layer-1, so the arrival time of the last bit of a frame and the departure time of the first bit of a frame are better observed.

A more detailed description of a PM frame is given below in Table 1. It should be noted that this is only an example of PM frame 20 using a current version of an Ethernet OAM frame as a basis; the future expansion to allow 802.1ah I-tags and B-tags and other header augmentation is assumed.

The SeqNum is a sequence number unique for each PM frame 20 within an interval. Providing an IID and SeqNum in the

TABLE 1

PM Frame Fields

| Parameter | Value | Index in MIB | Random |
|---|---|---|---|
| DA | 2 cases:<br>1) multicast to all MA: reserved multicast OAM address (with or without embedded MA level)<br>2) unicast (determined by dest MEP) | | |
| SA | determined by source MEP | | |
| S-type (if any) | (802.1ad PB Provider Bridge) | | |
| S-tag: Drop Eligible bit | either set or randomized | yes (1) | maybe (4) |
| S-tag: Drop Precedence | either set or randomized | yes (1) | maybe (4) |
| S-tag: S-VLAN | determined by source MEP | | |
| C-type (if any) | (802.1Q): 0x8100 | | |
| C-tag: User Priority | either set or randomized | yes (1) | maybe (4) |
| C-tag: C-VLAN | determined by source MEP | | |
| Ethertype | (802.1ag CFM) | | |
| Version (5 bits) | 0 (same as CFM version) | | |
| MA level (3 bits) | determined by source MEP | | |
| OpCode (8 bits) | ETH-PM | | |
| MA_ID (one of 3 types: (string, 2-octet integer, RFC 2685 7-octet VPNID), 1 TLV per type); 11 octets at least | determined by source MEP | | |
| source MEP (9-octet TLV) | determined by source MEP | yes (2) | |
| TimeStamp (64 bits) | fetched from clock and set by Sender at the last moment, read by Receiver before anything else | | |
| IID (32 bits) | interval id (decided by Sender) | yes | |
| SeqNum (32 bits) | frame id in interval | yes (3) | |
| Error (16 bits) | scale and multiplier, smallest representable value is 0.23 ns ($2^{-32}$ s), similar to that proposed by OWAMP | | |
| Padding: length and values, with security considerations if any (IZP) | | | yes |

Notes to Table 1:
(1): DE/DP/UP (Drop Eligible, Drop Precedence, User Priority) are used as index in the interval-based MIB, not in the individual frame MIB.
(2): the Source-MEP index is the concatenation of MA_ID and source MEP
(3): SeqNum is used as index in the individual frame MIB, not in the interval-based MIB
(4): depending on NMS setting. To resolve the DE/DP/UP fields choice in the S-tag and the C-tag, either a randomization or a set of specific values with NMS commands is allowed.

Most of the fields provided above are common for an Ethernet maintenance frame. The Ethertype field specifies whether the frame is a data frame of a maintenance frame. The OpCode field specifies the frame as a PM frame (and, if there are multiple PM frame types, this field can specify the type of PM frame).

The Timestamp, IID, SeqNum, Error and Padding fields are specific to the PM frame. In a given implementation, some fields may be omitted, or there may be different types of PM frames 20 with different fields.

The Timestamp field contains one or more timestamps provided by the Senders 34 of the PM modules 20. The timestamp is provided by the Sender 34 immediately prior to transmission of a PM frame 20 and the local clock is read by a Receiver 36 immediately upon reception of the PM frame 20 in order to have as little overhead delay as possible.

The IID and SeqNum comprise the ID field 28. The IID represents an interval, i.e., a stream of related PM frames 20. PM frame can eliminate the need for setting up a session prior to sending PM frames. For example, if a destination MEP 50 starts receiving PM frames with a new IID, it can assume that a new performance measurement cycle is being invoked and begin taking measurements on that stream.

For instance, the delay variation measurement module needs to select certain frames in a stream, and a selection algorithm could rely on frame IDs (although the Min-to-Max selection function, which chooses the smallest delay—Min—and largest delay—Max—in an interval with the difference between Min and Max being the computed delay variation, is the most likely to be used). Another example is the loss measurement module, which must recognize frames as belonging to an agreed measurement interval: defining an interval based on frame IDs eliminates possible errors that can happen when defining intervals with time values (frames near the beginning or the end could be incorrectly counted in or out). For the possible future metric of Reordering (useful for real-time video transmission performance monitoring), the sequence number will also be necessary. As for the length of the ID, at least 32 bits should be used, so as to be able to discriminate between more than 4 billions frames in a stream. To justify the need for more than 16 bits (which allow for less than 66 thousands unique IDs) for the ID, it should be considered that since the usual loss threshold is a few minutes (say 200 seconds), with given a line interface speed of 40 Gb/s, a smallest Ethernet frame of 72 bytes (including preamble and checksum, such as a cycle redundancy check, or "CRC", or a frame check sequence, or "FCS"), the maximum number of frames would be almost 14 billion, only a small fraction of them being allowed to be OAM-PM (due to the requirement of negligible traffic). Therefore, a 16-bit ID could prove to be too limited.

The Padding field is of variable size and content. Varying the size of PM frames within an interval provides the benefit of more accurate measurement, since real user data frames can have any arbitrary size, so OAM active measurement frames having variable size provides more realistic measurements. Varying the content, i.e., the sequence of "0"s and "1"s, also provides more accurate measurements, since certain hardware optimizations, such as data compression, could bias the measurement if it is made with OAM frames each with the same profile. Accordingly, the preferred embodiment uses a payload which is representative of real data frames and less subject to measurement bias.

Figure 5:
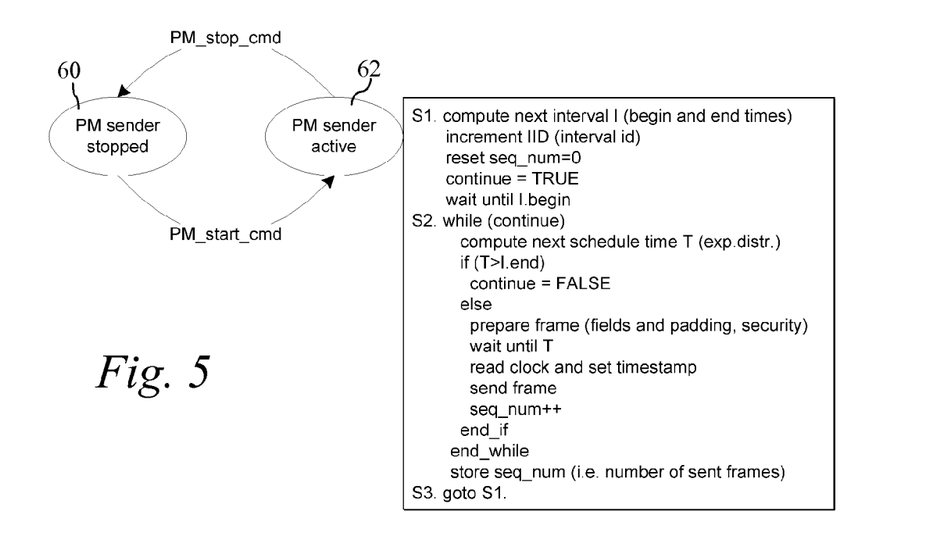
FIG. 5 illustrates a state diagram of the Sender of a PM module.

FIG. 5 illustrates a state diagram of the Sender 34. The Sender 34 has two states: active 60 or stopped 62. In the stopped state 60, PM packets 20 are not being sent. Upon receiving a start command (typically from the NMS 42), the Sender 34 transitions to the active state 62. In the enabled state, the Sender 34 sends a stream of one or more PM packets 20 to a node associated with a destination MEP 50$d$. If the measurement is a two way measurement, the destination MEP 50$d$ will send the PM packet back to the source MEP 50$s$. FIG. 5 shows pseudo-code for the operation of active state 62. First, start and stop times for the interval are determined and an IID is assigned to the interval. The SeqNum is reset. When the start time is reached, the Sender 34 starts sending PM frames 20. For each frame to be sent, a scheduled send time is computed, preferably at random intervals. The frame is prepared with header information, IID, SeqNum and so on, such that the frame is ready for transmission, other than the timestamp. Immediately before sending the PM frame 20, the timestamp is inserted. Once the PM frame is sent, SeqNum is incremented and the next PM frame, if any, is prepared by computing a scheduled send time and preparing the PM frame.

The state diagram of FIG. 5 is directed to a source MEP 50$s$. An intermediate MIP 52, if adding a timestamp, will only need to add the received timestamp and the sending timestamp to the PM frame 20 (this is typically performed by creating a new frame using information from the received PM frame 20), and send the new frame to the next MIP 52 or destination MEP 50$d$.

The Sender can be activated or deactivated by the NMS 42. When the Sender 34 is active, it decides for measurement intervals duration, one at a time, scheduled in the future. It maintains unique IIDs (Interval IDs), within the scope of the sender device. The pair {source MEP, IID} defines uniquely an interval (within a rotation of the IID number) and is used as the main index in the storage tables. If multiple instances run in a MEP, they will share the same IID allocator, so as to guarantee unique per-MEP IIDs when an instance starts a new interval. Intervals may overlap when there are multiple instances. The duration should be set to a "reasonable" value, not too long, not too short depending on the sending rate and the storage capacity of the Receivers. The duration can be randomized, but it is not required.

When a measurement interval starts, the next schedule time for sending the next PM frame is computed using a suitable algorithm. One such algorithm is described in *draft-ietf-ippm-owdp-*14.*txt*, A One-way Active Measurement Protocol (OWAMP), IETF, December 2004. This algorithm is repeated below:

Algorithm S: Given a real positive number 'mu', produce an exponential random variate with mean 'mu'.

First, the constants $Q[k]=(\ln 2)/(1!)+(\ln 2)^2/(2!)+\ldots+(\ln 2)^k/(k!)$, $1<=k<=11$ are computed in advance. The exact values which MUST be used by all implementations are given in the next section. This is necessary to insure that exactly the same pseudo-random sequences are produced by all implementations.

S1. [Get U and shift.] Generate a 32-bit uniform random binary fraction $U=(.b0\ b1\ b2\ldots b31)$ [note the binary point]

Locate the first zero bit b_j, and shift off the leading (j+1) bits, setting U<-(.b_{j+1} ... b31)

Note: In the rare case that the zero has not been found, it is prescribed that the algorithm return (mu*32*ln2).

S2. [Immediate acceptance?] If U<ln 2, set X<-mu*(j*ln 2+U) and terminate the algorithm. (Note that Q[1]=ln 2.)

S3. [Minimize.] Find the least k>=2 such that U<Q[k]. Generate k new uniform random binary fractions U1, ... ,Uk and set V<-min(U1, ... ,Uk).

S4. [Deliver the answer.] Set X<-mu*(j+V)*ln 2.

To clarify, it can be noted that the limit of Q[k] is 1 when k increases indefinitely, and that the binary fraction notation (.b0 b1 ... b31) means $$\sum_{i=0}^{31} \frac{b_i}{2^{i+1}} = b_0 \cdot 2^{-1} + b_1 \cdot 2^{-2} + \ldots + b_{31} \cdot 2^{-32}.$$

The eleven values of Q[k] are as follows (quote from draft-ietf-ippm-owdp-14.txt, referenced above):
1 0xB17217F8,
2 0xEEF193F7,
3 0xFD271862,
4 0xFF9D6DD0,
5 0xFFF4CFD0,
6 0xFFFEE819,
7 0xFFFFE7FF,
8 0xFFFFFE2B,
9 0xFFFFFFE0,
10 0xFFFFFFFE,
11 0xFFFFFFFF For example, $Q[1] = \ln 2$ is indeed approximated by $$0xB17217F8/(2**32)$$

$$= 0.693147180601954; \text{ for } j > 11,$$

$$Q[j] \text{ is } 0xFFFFFFFF.$$

The algorithm returns a duration X, which is used to compute an instant T in the future, at which the frame will be sent.

Before this scheduled sending time T arrives, the randomized frame should be prepared in memory and be made ready to send, with the possible exception of the timestamp: it can be read at the last moment, or estimated accurately enough using T. Once the timestamp is set in the frame, the checksum can also be computed. The other fields should be filled according to Table 1. The frame length is also randomized (uniformly between min and max length) and the padding bits are randomized too (uniformly between 0 and 1). Moreover, any security-related frame construction procedure should be performed at that point. The implementation should take into account the fact that T could arrive soon, and have a ready-to-send frame at any time, maybe by building a few of them in advance.

When the measurement interval is over, the Sender logs the number of frames sent for each interval, for later NMS retrieval, and the loop restarts.

Figure 6:
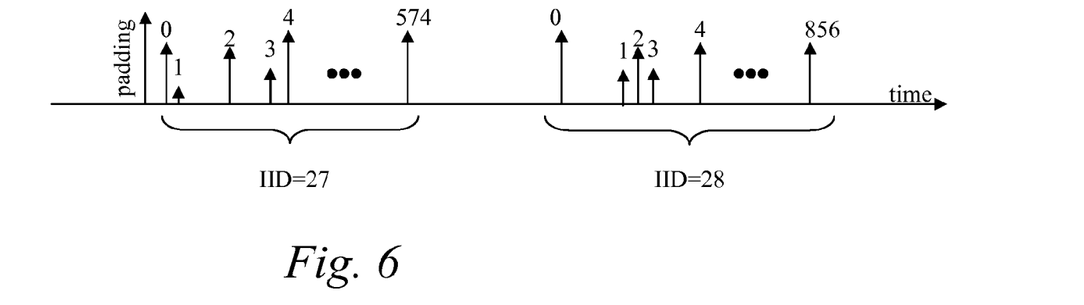
FIG. 6 illustrates an example of random timing and length of two measurement intervals; frames sent

FIG. 6 illustrates an example of two intervals IID=27 and IID=28 with, respectively, 575 and 857 frames sent. As shown, the time between sending PM frames 20 is not uniform and the length of the PM frames is varied as well.

Figure 7:
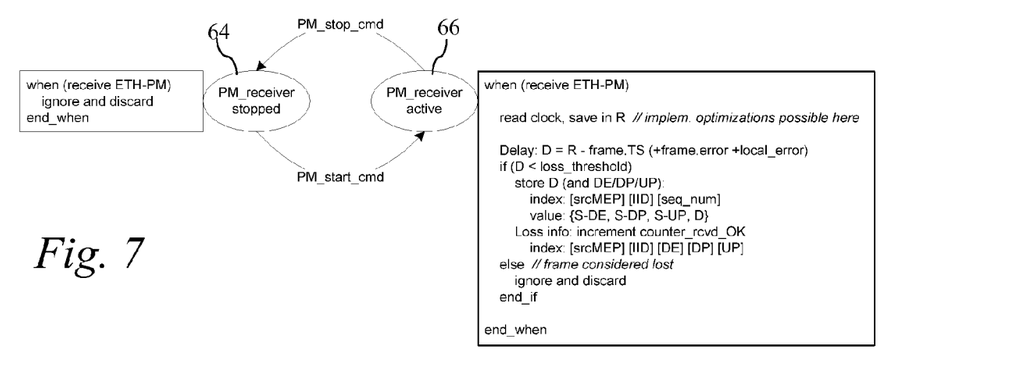
FIG. 7 illustrates a state diagram for the Receiver of a PM module.

FIG. 7 illustrates a state diagram for the Receiver 36. The Receiver 36 can be in a stopped state 64 or an active state 66. When it is deactivated, it ignores and discards the received PM frames. When it is activated, it first collects its local system clock, so as to have the most accurate arrival timestamp. An implementation optimization could consist in taking advantage of a clock module in the framer, which would obtain the time value as soon as the frame has entered the device and store in some efficient way (internal header, metadata, etc.). If such a module is not available, then the frame will experience more delays (port queue, port processing, bridge brain queue), and only then will be processed in the PM-specific portion of the Receiver. In that case, a systematic calibration error (estimation of the additional delays) should be included in the delay estimation, and be reported to the NMS 42.

The Delay is then computed and compared to the loss threshold. If the delay exceeds the loss threshold, the frame is deemed as lost and is ignored. Otherwise, a new entry is added in the MIB 38, indexed by the triple {source MEP, IID, seq_num}. The SourceMEP identifier is being defined in 802.1ag, currently as a concatenation of the MD name, the MA name, and the 13-bit local MEPID. Four values are stored: the 3 fields describing priorities (DE, DP, UP), which can possibly be undefined depending on which tags were defined in the frame, and the Delay for that frame.

The loss counter (actually, the number of received frames) is also maintained, indexed by the 5-uple {srcMEP, IID, DE, DP, UP}. Users may either want to see that level of detail, or only see the average per {srcMEP, IID} over all priorities. The list of values for DE, DP, UP includes "undefined" for correct indexing: DE values are {0,1,undef}, whereas DP and UP values are {0,1,2,3,4,5,6,7,undef}. Besides, the index [undef][undef][undef] is invalid, and DE and DP are either both undefined or both defined.

Table 2 shows an example of a receiver in an arbitrary "MEP3", showing just the entries corresponding to PM frames coming from a "MEP6" and its interval 27. In this example, all frames were received, except frame #3, whose seq_num is absent from that table. In the examples below, the DE/DP/UP indexing is not shown, for simplicity. The examples could correspond to a measurement case with all identical priorities.

TABLE 2

Receiver MIB example - Frame delay

| srcMEP | IID | seq_num | Delay Value |
|---|---|---|---|
| MEP6 | 27 | 0 | 25.3 µs |
| MEP6 | 27 | 1 | 29.2 µs |
| MEP6 | 27 | 2 | 21.5 µs |
| MEP6 | 27 | 4 | 33.2 µs |
| MEP6 | 27 | 5 | 25.4 µs |
| ... | ... | ... | ... |
| MEP6 | 27 | 574 | 38.7 µs |

Table 3 shows the counter used for loss ratio estimations, again without the {DE, DP, UP} priorities index.

TABLE 3

Received Okay example

| srcMEP | IID | rcvd_OK |
|---|---|---|
| MEP6 | 27 | 574 |
| MEP6 | 28 | 857 |

In addition to communicating with the NMS 42, the NMS interface module 40 could also implement "post-processing" functions, such as the DV (delay variation) computation, the MIB purge when it approaches saturation or after certain pre-defined delays, or more advanced functions, with a view to reducing the load on the NMS 42 as well as the amount of data to be exported.

Figure 8:
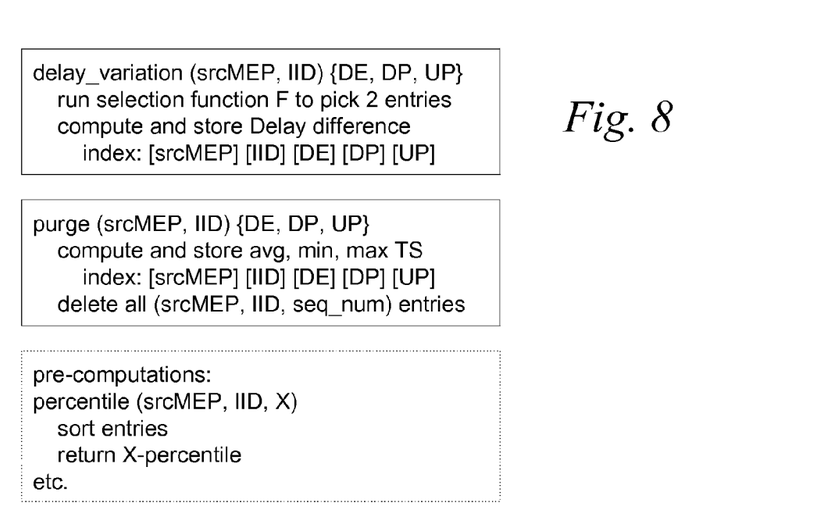
FIG. 8 illustrates a delay variation computation.

The DV computation is shown in FIG. 8. The DV computation function runs a selection function, typically the Min-to-Max (search for the smallest and largest delays in the sample). The selection function applies to a measurement interval, defined by a source MEP, possibly on a per-{DE,DP, UP} basis. It may or may not need to be sure that the interval is over. If the function requires this, then a way to detect completion of a source MEP interval N is to observe arriving frames: if a frame belonging to a subsequent interval has arrived, its timestamp can be used to determine for sure, without signalling, an instant at which the destination MEP can not receive any more frames from interval N. In other word, if interval N is to be validated, then whenever a frame from an interval N'>N arrives, the instant T=frame.Timestamp+loss_threshold is guaranteed to be after the end of interval N. A simpler selection function, such as "first-two" (selects the first two entries of a sample) does not need the interval to be over to start computation, since it only needs at least two entries.

The purge function makes room in the MIB: it removes all the entries from an interval and replaces them with a summary (min, avg, median, max delays). An implementation possibility is to combine the purged data with the received frame count and the DV (Delay Variation), as shown on Table 4:

TABLE 4

Receiver Interval-based MIB example

| srcMEP | IID | minDelay | avgDelay | maxDelay | DV (F: Min-to-Max) | count |
|---|---|---|---|---|---|---|
| MEP6 | 27 | 21.5 µs | 26.6 µs | 38.7 µs | 17.2 µs | 574 |
| MEP6 | 28 | 20.2 µs | 25.9 µs | 105.0 µs | 84.8 µs | 857 |

The NMS will perform the collection of Delay and Delay variation information, and the correlation to compute Losses:

MEP6-sender reports 575 frames sent in interval 27

MEP3-receiver reports 574 frames received from MEP6 corresponding to MEP6's interval 27

NMS can compute a loss rate estimate for MEP6-defined interval 27: (1−574/575)=0.00174=0.174%

MEP6-sender reports 857 frames sent in interval 28

MEP3-receiver reports 857 frames received from MEP6 corresponding to MEP6's interval 28

NMS can compute a loss rate estimate for MEP6-defined interval 28: (1−857/857)=0.00000=0.000%

The loss rate estimation can only be as accurate as the sample size: a rule of thumb is that about 20 or 30 events at least should be observed in order to make statistical conclusions. Therefore, a sample of size X can not detect losses smaller than 20/X. This is not a significant problem, since the goal is to notify the NMS 42 of potential problems that can lead to SLA non-conformance or even to a connectivity loss.

The present invention provides significant advantages over the prior art. First, it can be easily implemented within the existing OAM framework, and can share hardware already used for the OAM functions. This makes the invention easy to manage for operators and providers. Second, the solution can use randomizations to ensure better statistical significance of layer-2 measurements. A layer-2 driver is likely to run much closer (if not directly in) the network card than a layer-3 processing module, thus obtaining better estimates of the real sending times Oust before the first bit is sent) and reception times Oust after the last bit is received). While these errors can be compensated by calibration, it is still best to minimize or avoid them altogether.

Third, the invention does not need a signaling protocol whereby the nodes in the MA are informed of the parameters of the measurement session; the interval ID allows a source to initiate the equivalent of a session, without establishing an actual session, therefore the performance monitoring does not need a session protocol such as OWAMP or TWAMP. By configuration of the source parameters, the interval IDs provide the ability to adjust the frequency of the samples and size of their grouping, thereby improving the sample quality for better statistical significance. Fourth, the Receiver function does not need to change based on the specifics of the measurement session; its function remains the same whether the test is automatically initiated by the Sender or if it is on-demand (initiated by an operator), and whatever the randomization choices (such as padding variations). The performance measurement works not only in a point-to-point context, but also in a multipoint context; in other words, the same receiver function can be used in multimetrics, where, for example, one source broadcasts/multicasts OAM frames to many destinations. Fifth, since it is integrated in the OAM, additional overlay equipment is not required. Sixth, it leverages the advantages of layer-2 monitoring: more accurate timestamping and deterministic paths.

While the present invention has been described in connection with and Ethernet protocol for layer-2, it should be noted that it could be used in conjunction with other layer-2 protocols as well.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A method for performance monitoring in a network, comprising the steps of:
    generating a plurality of layer-2 performance monitoring frames by a first node, wherein the performance monitoring frames include:
    one or more type fields identifying the frame as a performance monitoring frame;
    an interval session identifier identifying a specific performance measuring, interval of related performance monitoring frames;
    a sequence number uniquely identifying each performance monitoring frame in the specific performance measuring interval;
    an origination timestamp field specifying the time that the frame is transmitted; and
    a padding field, wherein at least one of size and content of the padding field of one or more of the plurality of performance monitoring frames is varied during the specific performance measuring interval;
    transmitting the plurality of performance monitoring frames through the network;
    receiving the plurality of performance monitoring frames by a second node in the network and storing an arrival timestamp associated with the reception of the performance monitoring frames, wherein the second node determines that the specific performance measuring interval is being initiated in response to the interval session identifier of one of the received plurality of performance monitoring frames is different than interval session identifiers of previous performance monitoring frames; and
    determining performance criteria from the origination and arrival timestamps of the performance monitoring frames.

2. The method of claim 1, wherein a transmission interval of the plurality of the performance monitoring frames is varied during the specific performance measuring interval by transmitting the performance monitoring frames at varied time spacings.

3. The method of claim 1, wherein content of the padding field is varied by varying a sequence of data bits in the padding field.

4. The method of claim 1, wherein the size of the padding field of the performance monitoring frames is varied.

5. The method of claim 1, wherein contents of the performance monitoring frames is varied.

6. The method of claim 1, wherein the origination timestamp is generated immediately prior to transmitting the performance monitoring frames through the network.

7. The method of claim 1 wherein each performance monitoring frame further includes a type field for identifying the performance monitoring frame as an Ethernet Operations, Administration and Management (OAM) type performance monitoring frame, wherein the type field includes a management level identifier for customer, provider and operator networks.

8. The method of claim 1 wherein one or more nodes intermediate to the first and second nodes also generate a timestamp stored in the performance monitoring frame.

9. Circuitry for performance monitoring in a network, comprising:
    circuitry for generating layer-2 performance monitoring frames by a first node, wherein the performance monitoring frames include one or more type fields identifying the frame as a performance monitoring frame, an interval session identifier identifying a specific performance measuring interval of related performance monitoring frames, a sequence number uniquely identifying each performance monitoring frame in the specific performance measuring interval, and an origination timestamp field specifying a time that the frame is transmitted and a padding field, wherein at least one of size and content of the padding field of one or more of the performance monitoring frames is varied during the specific performance measuring interval;

circuitry for transmitting the performance monitoring frames through the network during the specific performance measuring interval;

circuitry for receiving the performance monitoring frames by a second node in the network and storing an arrival timestamp associated with the reception of the performance monitoring frames, wherein the second node determines that the specific performance measuring interval is being initiated in response to the interval session identifier of one of the received performance monitoring frames is different than interval session identifiers of previous performance monitoring frames; and circuitry for determining performance criteria from the origination and arrival timestamps of the performance monitoring frames.

10. The performance monitoring circuitry of claim 9 wherein the generating circuitry generates the performance monitoring frames at varied time spacings.

11. The performance monitoring circuitry of claim 9 wherein the generating circuitry generates performance monitoring frames wherein the content of the padding field is varied by varying a sequence of data bits in the padding field.

12. The performance monitoring circuitry of claim 11 wherein the generating circuitry generates performance monitoring frames wherein the size of the padding field is varied.

13. The performance monitoring circuitry of claim 9 wherein the generating circuitry stores the origination timestamp in the performance monitoring frame immediately prior to the transmitting of the performance monitoring frame.

14. The performance monitoring circuitry of claim 9 wherein the generating circuitry generates a type field for identifying the performance monitoring frame as an Ethernet Operations, Administration and Management (OAM) type performance monitoring frame, wherein the type field includes a management level identifier for customer, provider and operator.

15. The performance monitoring circuitry of claim 9 and further including one or more nodes intermediate to the first and second nodes that also generate a timestamp stored in the performance monitoring frame.

16. Circuitry for performance monitoring in a network node, comprising:

circuitry for receiving performance monitoring frames by the network node, wherein the performance monitoring frames have one or more type fields identifying the frame as a performance monitoring frame, an interval session identifier identifying a specific performance measurement interval of related performance monitoring frames, a sequence number uniquely identifying each performance monitoring frame in the specific performance measurement interval, an origination timestamp field specifying the time that the frame is transmitted and a padding field, wherein at least one of size and content of the padding field of one or more of the performance monitoring frames is varied during the specific performance measurement interval;

circuitry for determining that the performance measurement interval is being initiated in response to the interval session identifier of one of the received performance monitoring frames having a first value that is different than previous interval session identifiers; and circuitry for determining performance criteria for the performance measurement interval from the origination and arrival timestamps of the performance monitoring frames with the interval session identifier having the first value.

\* \* \* \* \*